US012448577B2

(12) United States Patent
Bourdais et al.

(10) Patent No.: US 12,448,577 B2
(45) Date of Patent: Oct. 21, 2025

(54) HYDROTHERMAL CARBONISATION METHOD

(71) Applicant: SUEZ INTERNATIONAL, Paris (FR)

(72) Inventors: Jean-Louis Bourdais, Chateaubriant (FR); Marlène Choo-Kun, Marseilles (FR)

(73) Assignee: SUEZ INTERNATIONAL, Paris (FR)

( * ) Notice: Subject to any disclaimer, the term of this patent is extended or adjusted under 35 U.S.C. 154(b) by 30 days.

(21) Appl. No.: 18/033,507

(22) PCT Filed: Nov. 3, 2021

(86) PCT No.: PCT/EP2021/080464
§ 371 (c)(1),
(2) Date: Apr. 24, 2023

(87) PCT Pub. No.: WO2022/096484
PCT Pub. Date: May 12, 2022

(65) Prior Publication Data
US 2023/0323225 A1    Oct. 12, 2023

(30) Foreign Application Priority Data

Nov. 4, 2020 (FR) ..................... 2011305

(51) Int. Cl.
*C10J 1/26*     (2006.01)
*C02F 11/10*   (2006.01)
*C02F 11/122*  (2019.01)

(52) U.S. Cl.
CPC ............... *C10J 1/26* (2013.01); *C02F 11/10* (2013.01); *C02F 11/122* (2013.01);
(Continued)

(58) Field of Classification Search
None
See application file for complete search history.

(56) References Cited

U.S. PATENT DOCUMENTS 10,308,887 B2  6/2019 Kusche
2010/0162619 A1* 7/2010 Peus ............... C10L 9/083
44/605
(Continued)

FOREIGN PATENT DOCUMENTS

CN  104155326 A  11/2014
CN  107699306 A   2/2018
(Continued)

OTHER PUBLICATIONS

International Search Report and Written Opinion of the International Searching Authority, issued in PCT/EP2021/080464, mailed Jan. 26, 2022; ISA/EP.
(Continued)

*Primary Examiner* — Tam M Nguyen
(74) *Attorney, Agent, or Firm* — Harness, Dickey & Pierce, PLC

(57) ABSTRACT

The invention relates to a method for hydrothermal carbonisation of biomass containing organic matter, the method comprising: —injecting the biomass, a heat transfer fluid and a reagent into a reactor (1), —circulating a mixture consisting of the biomass, the heat transfer fluid and the reagent under specific pressure and temperature conditions for transforming the organic matter by hydrothermal carbonisation. The invention consists in: 1) determining the production rate of the emitted gas $T_e$ during the hydrothermal carbonisation reaction; 2) comparing the determined production rate of the emitted gas $T_e$ with a predefined value for the set gas production rate $T_c$, and 3) adjusting at least one of the reaction control parameters chosen from among the temperature within the reactor (1), the quantity of injected reactant, and the residence time in the reactor in order to adjust the production rate of the emitted gas $T_e$, such that the value of said production rate of the emitted gas Te tends to be equal to the value of the set gas production rate
(Continued)

$T_c$. The invention is applicable to treatment of biomass containing organic matter.

16 Claims, 2 Drawing Sheets

(52) U.S. Cl.
CPC ...... *C02F 2209/02* (2013.01); *C02F 2209/03* (2013.01); *C02F 2209/44* (2013.01); *C10J 2300/0923* (2013.01); *C10J 2300/1612* (2013.01); *C10J 2300/183* (2013.01); *C10J 2300/1861* (2013.01)

(56) References Cited

U.S. PATENT DOCUMENTS

| | | | | |
|---|---|---|---|---|
| 2011/0056125 | A1* | 3/2011 | Antonietti | C10L 9/00 44/605 |
| 2011/0112246 | A1* | 5/2011 | Antonietti | C10L 5/44 524/832 |
| 2012/0000120 | A1* | 1/2012 | Stark | B01J 8/10 44/605 |
| 2012/0103040 | A1* | 5/2012 | Wolf | C10L 5/366 71/24 |
| 2015/0259209 | A1 | 9/2015 | Vyskocil | |
| 2016/0052815 | A1* | 2/2016 | Pardo | C02F 11/122 422/187 |
| 2017/0233659 | A1* | 8/2017 | Pardo | C10B 47/00 201/14 |
| 2018/0237698 | A1 | 8/2018 | Kusche | |
| 2019/0263700 | A1* | 8/2019 | Xu | C11B 1/02 |
| 2020/0188872 | A1 | 6/2020 | Kumar et al. | |
| 2020/0255759 | A1 | 8/2020 | Coronella et al. | |
| 2021/0285017 | A1* | 9/2021 | Feldmann | C10B 53/02 |

FOREIGN PATENT DOCUMENTS

| | | |
|---|---|---|
| CN | 107750289 A | 3/2018 |
| DE | 102011055990 A1 | 6/2013 |
| DE | 102013013724 A1 | 2/2015 |
| DE | 102016125286 A1 | 6/2018 |
| EP | 2166061 A1 | 3/2010 |

OTHER PUBLICATIONS

First Chinese Office Action and Search Report from the Chinese Patent Office for Chinese Application No. 202180072313.6 dated Jun. 30, 2025, 22 pages.

* cited by examiner

[Fig. 1]
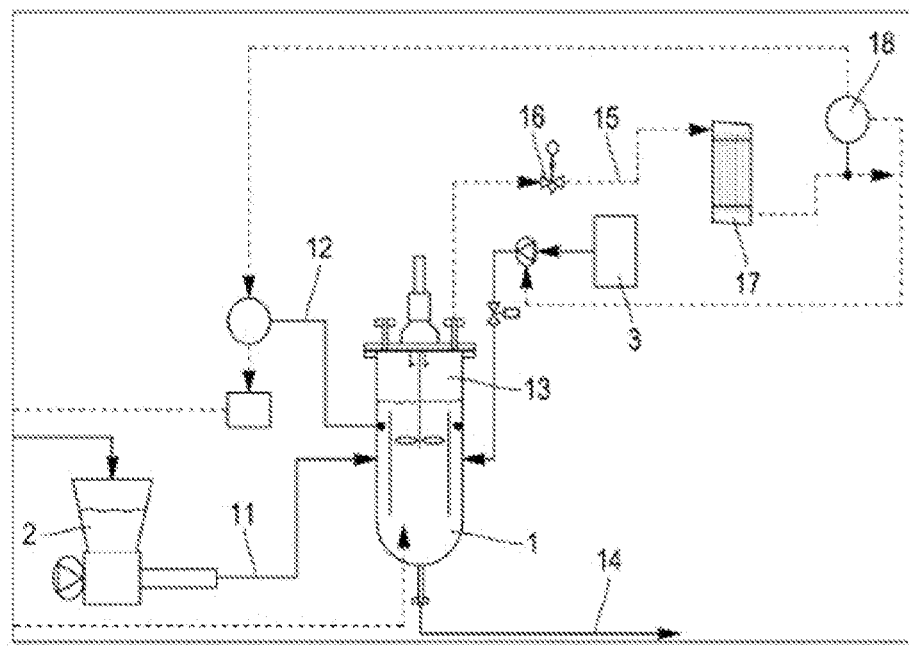
[Fig. 2]
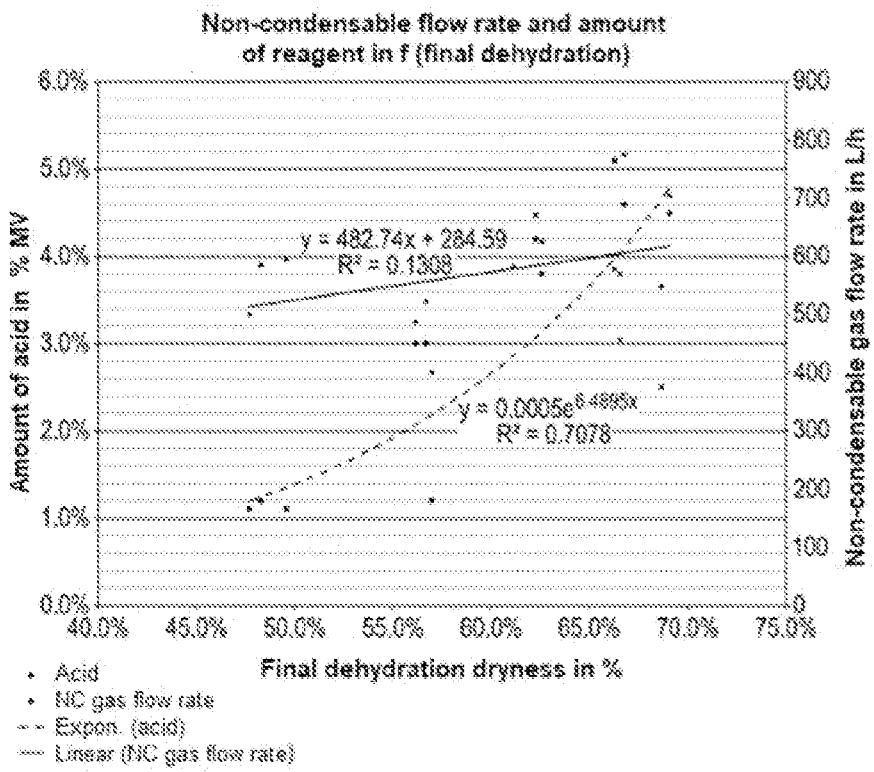

[Fig. 3]
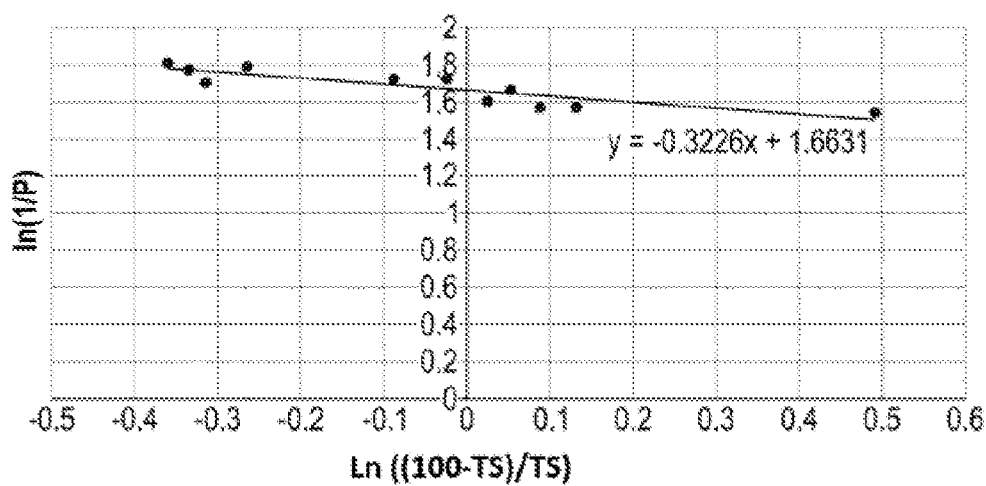

HYDROTHERMAL CARBONISATION METHOD

CROSS-REFERENCE TO RELATED APPLICATIONS

The application is a National Phase Entry of International Patent Application No. PCT/EP2021/080464, filed on Nov. 3, 2021, which claims priority to French Application No. FR2011305, filed on Nov. 4, 2020, both of which are incorporated by reference herein.

TECHNICAL FIELD

The present invention relates to a thermal conditioning method using the thermochemical reaction of hydrothermal carbonisation.

BACKGROUND

Hydrothermal carbonisation, a well-known reaction under the acronym HTC is a natural reaction that takes place deep in the earth under pressure at high temperatures. It results in the production of coal and gas from biomass. Hydrothermal carbonisation, also referred to as HTC, has been transposed to the industrial environment through thermal conditioning to drastically improve the dehydration of biomass such as sewage sludge or organic waste, in order to transform it into a high added value product.

The thermal conditioning, of which the core of the method is the HTC reaction, is carried out at a high temperature—between 175° C. and 260° C.—and generally in an autoclave under pressure, typically from 9 to 50 bar (that is about 1 to 5 MPa), for a time that typically ranges from 5 min to 12 h. Depending on the dehydration equipment downstream of thermal conditioning, the temperature and pressure applied for the HTC reaction, the biomass very easily releases its water by mechanical dehydration and is transformed into biochar. The slightly exothermic reaction is accelerated by the addition of a catalyst, for example by virtue of the presence of either an acid (for example citric or sulphuric or acetic acid) or a base (for example caustic soda).

Overall, the HTC reaction can be depicted as follows:

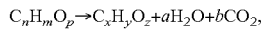

$$C_nH_mO_p \rightarrow C_xH_yO_z + aH_2O + bCO_2,$$

This thermochemical reaction modifies macromolecular but also molecular arrangements, with the consequence of making the matter more hydrophobic and of concentrating especially the carbon atoms and thus the intrinsic calorific value. This significant increase in the hydrophobicity of the organic matter makes it easier to dehydrate in a subsequent step, for example mechanical pressing or centrifuging.

Such a method is especially used to drive the dehydrating of sludge from wastewater treatment plants to very high dry matter levels. Indeed, when the thermal conditioning step is coupled with a post-dehydrating step, dry matter content levels in the order of 70% can be achieved. This is why coupling of hydrothermal carbonisation with a post-dehydration step is called "ultra-dehydration".

Before the application of ultra-dehydrating to sewage sludge, this high dryness could only be achieved by drying, mainly thermal, methods which are very energy intensive despite the improvements in these methods.

Mechanical dehydrating alone, by pressing, which is not very energy intensive, cannot, on the other hand, exceed 35-40% depending on the content of organic matter present in the sludge and its nature without this coupling with the hydrothermal carbonisation reaction.

The quality of the dehydration downstream of thermal conditioning accommodating the hydrothermal carbonisation reaction, at such a level, is intimately related to the operating conditions applied, in other words, to the correct achievement of a minimum progress of the HTC reaction. The kinetics of this HTC reaction depend on the residence time of the product in the reactor, the level of temperature and pressure and the amount of reagent present, but also on the nature of the biomass introduced into the reactor. The quality and properties of the biochar obtained also depend on these factors, especially after a subsequent post-dehydration step.

However, when the settings of the HTC step are recorded, the dehydration result—especially the dryness of the "ultra-dehydrated" sludge—is only noticeable several hours after the sludge has passed through the HTC reactor.

It is therefore only a posteriori that the efficiency of the HTC reaction will be judged sufficient or not, that is after the subsequent post-dehydration step, for example by mechanical pressing of the so-called carbonised product, then called a cake.

Moreover, the sewage sludge treated by HTC are variable in quality, especially in terms of dryness, over time. However, the dry matter content measured directly upstream of the hydrothermal carbonisation reactor does not make it possible to predict the organic matter content which is involved in the carbonisation reaction. This measurement of the amount of volatile matter is generally known more than 24 hours after the sample is taken. Indeed, said sample should be placed in an oven at 105° C. for 24 hours to know the dryness thereof. The same sample will be then placed in an oven at 550° C. for 2 hours to burn the organic fraction of dry matter.

Currently, solutions implemented to follow the progress of the HTC reaction are based on measuring the pH at the outlet of the reactor and preferably after subsequent heat exchangers used to cool the sludge, that is 2 to 3 hours already after the injection of the sludge and the reagents into the HTC reactor.

However, this measurement is not sufficient to predict proper final dehydrating. The quality of dehydrating is revealed after the pressing operation of the dehydrated matter into a cake, and only analyses of this cake can determine the performance of the ultra-dehydrating sequence (HTC+post-dehydrating). This time between the moment the sludge enters the reactor and the moment of analysis of the dehydrated cake can be well over 10 hours. It is also highly dependent on the storage of carbonised sludge leaving the reactor. In addition, the storage mixes the carbonised sludge and homogenises several hours of production. The pH measurement is therefore not a sufficiently accurate indicator of the dehydrating level that can be achieved.

If the dehydrating performance is found to be insufficient, then it is possible, among other things, to increase the amount of reagent, the residence time in the reactor or the heating temperature of the reactor. On the other hand, it is necessary to wait for several final dehydration batches to quantify the effect related to increase in one of these three parameters, especially because of the different downstream storage steps.

In other words, the dehydrating performance and thus the dryness of the cake of dehydrated matter are therefore the result of an adjustment made almost 24 hours ago. The reduction, or even cancellation, of this latency time following the optimisation of the reactor operating parameters would therefore constitute a clear improvement in the industrial productivity of this technology, thus obtaining real time monitoring of its performance.

Several techniques have been developed to address this issue.

Document U.S. Ser. No. 10/308,887 thus showed that during hydrothermal carbonised, biomass is converted to biochar. The reaction yield depends on the reaction conditions, including the duration of the carbonisation reaction or the period during which a liquid manure comprised of water and biomass remains in the reaction vessel and is exposed to pressure and temperature. These conditions should be selected so as to obtain the driest possible residue. It has been shown that changes in the amount of dry residue during the carbonisation reaction exhibit a curve that is similar, to a large extent, to that of the pH value of the treated biomass, which pH is much easier to follow than the determination of the dry residue during the ongoing reaction. However, the measurement of the pH of the carbonised sludge is difficult to carry out directly in the reactor, as there is no instrument that can withstand temperatures and pressures within the reactor.

The pH analysis is therefore usually carried out downstream of the reactor, after expansion to atmospheric pressure and to temperatures well below 100° C. The measurement requires regular calibration of the pH probe.

The indicator of the pH value of the carbonised sludge is therefore an indirect and a posteriori indication of the progress of the reaction within the reactor and in an industrial phase of continuous production of carbonised sludge. Such a setting is therefore not fast enough to anticipate the effect produced, as explained above.

In U52015/0259209, a hydrothermal carbonisation reaction is described which aims to obtain the highest possible yield of some substances, in particular the highest possible yield of carbon. Biomass of very different types and qualities is treated by the method, so that the reaction can take place very differently within each individual batch. Influencing the method is usually problematic, because the process runs in a closed way. For this reason, a bypass line is defined for water of the method to pass therethrough, in which line a sensor is installed to define the total organic carbon versus dissolved carbon. An adaptation of the method parameters can then be undertaken manually or by means of a process controller, depending on the measurement results from the sensor. This allows for faster monitoring and regulation, but a specific facility should be implemented.

In DE102016125286, it is proposed to recover the gaseous and liquid compounds of the reaction degradation, condensing them so that they can be analysed and the results fed back to a control system for regulating the reactor based on these data. Again, a delay of several hours is required to perform this analysis. The other drawback lies in the volume of the compounds, which is not identified in this patent and which is nevertheless inseparable from the degree of the reaction.

To date, therefore, no systems are known that can regulate the HTC reaction in the reactor in real time without significant modification of the existing facilities. In an industrial deployment situation, however, the needs for real-time regulation of such a method are major. It is therefore with a view to expanding and optimising the method that the invention has been developed.

SUMMARY

The purpose of the present invention is to overcome the drawbacks of the state of the art by providing a method for tracking the degree of progress of the HTC reaction and for regulating said HTC reaction in the reactor in near "real time".

Thus, the invention relates to a method for hydrothermal carbonisation of biomass containing organic matter, said method comprising:

injecting biomass, a heat transfer fluid and a reagent into a reactor, circulating a mixture consisting of the biomass, the heat transfer fluid and the reagent under specific pressure and temperature conditions for transforming the organic matter by hydrothermal carbonisation, characterised in that:

1) the emitted gas production rate Te, during the hydrothermal carbonisation reaction, is determined;
2) said emitted gas production rate Te determined is compared with a value of predefined setpoint gas production rate Tc, and
3) at least one of the reaction drive parameters selected from the temperature within the reactor, the amount of injected reagent, and the residence time in the reactor is adjusted, to adjust the emitted gas production rate Te, so that the value of this emitted gas production rate Te tends to be equal to the value of the setpoint gas production rate Tc.

For the purposes of the invention, biomass comprises organic matter. It can especially be organic waste and/or sludge, especially sludge from water treatment plant, industrial or municipal wastewater.

In the following, the biomass entering the HTC step or reactor will be referred to as "incoming biomass" ("incoming sludge"), and the biomass from the HTC step will be referred to as "carbonised biomass". In the case where the method of the invention includes a subsequent dehydration step, the product of this step will be referred to as "dehydrated biomass" or "ultra-dehydrated biomass".

As already discussed, the organic matter of the biomass is transformed while it is subjected to specific pressure and temperature conditions in the HTC reactor. This transformation involves hydrolysis and then decarboxylation and dehydration of the organic matter in parallel with its own constituents.

It could have been observed that part of the organic matter of the incoming biomass "disappears" from the carbonised matter—dissolved and solid fraction—measured at the reactor outlet in the following proportions:

35 to 55% 0.

3 to 7% of H.

−1 to 5% C.

A mass balance highlights that the carbon and hydrogen produce $CO_2$ and $H_2O$ by a conventional oxidation-reduction reaction, 70% to 90% of the 02 disappeared being consumed by this reaction.

However, it is difficult to establish the precise balance of the elements C, H and O, because part of the gases formed during the HTC reaction remains dissolved in the liquid fraction, to be released after expansion in the storage tank of the carbonised biomass. However, these dissolved and gaseous gases are in equilibrium and vary in the same direction. The water vapour formed by the HTC reaction is indistinguishable from water vaporised from the incoming biomass. Thus, the gas produced by the HTC reaction is partly found at the reactor outlet—a part that can be measured—and a soluble part found in the carbonised biomass storage tank, which cannot be measured.

However, the inventors have demonstrated that there is a correlation between this part of the gas emitted in the reactor and the degree of progress of the ongoing HTC reaction. They have also established a correlation between the emitted gas production rate and more particularly the emitted gas flow rate, the latter being measurable directly by the non-condensable gas flow rate measured at the outlet of the reactor or indirectly by the difference between the pressure in the reactor measured at the end and the beginning of the reaction (this difference in pressure resulting from transformation of the matter, and therefore from the progress of the reaction), thus between the emitted gas flow rate or the pressure in the reactor and the rate of dryness of the dehydrated biomass.

From experimental measurements, the inventors were able to establish a mathematical relationship between the final pressure in the non-condensable gas reactor and the dryness in a batch method:

$$\text{Ln } P = f(\text{Ln}(TS/(0.0001-TS))) \text{ with } f(x) = -03226*x + 10.8734 \text{ with:}$$

P: representing the final pressure at 75° C. in the hydrothermal carbonisation reactor (in Pa), which corresponds to the gas production by the HTC reaction, and
TS: final dryness of the cake in g/L.

Thus, in a batch method, the amount of gas emitted increases with the degree of progress of the reaction, which induces a higher pressure. A variation in pressure thus reveals a variation in the progress and/or performance of the reaction, which can be influenced by adjusting one or more reaction parameters, such as the amount of reagent injected for example.

In a continuous method, the amount of gas emitted increases with the degree of progress of the reaction, at constant pressure, and leads to a greater gas flow rate. Hence, a variation in the emitted gas flow rate reveals a variation in the progress and/or performance of the reaction, which can be influenced by adjusting one or more reaction parameters, such as the amount of injected reagent, for example. The temperature within the reactor can also be adjusted by monitoring the temperature of the heat transfer fluid and/or by adjusting the residence time in the reactor by monitoring the flow rate of incoming biomass.

Thus, the indicator of the progress of the reaction is indeed the emitted gas production rate, more particularly the so-called non-condensable gases, directly related by chemical reaction to the stoichiometric conditions.

In the case of a batch-operated HTC method, the emitted gas production rate Te is determined from the measurement of the pressure prevailing within the reactor during a batch, more precisely at the end of the batch and more precisely, at the end of the carbonisation and cooling cycle at a set target temperature. Indeed, as the device used is totally sealed, the production of reaction gas, and therefore of emitted gas, is revealed by the final pressure in the reactor. The initial amount of product introduced is constant and the initial pressure is equal to the ambient air. Any higher pressure after the reaction is therefore the result of a gas residing in the reactor, whose saturation pressure is much lower than that of water. More precisely, as the partial water pressure is constant and known at a given temperature, knowledge of the temperature and pressure in the reactor at the end of the batch allows the overpressure associated with the production of non-condensable gases by the HTC reaction to be calculated precisely. The pressure or overpressure of the non-condensable gases present in the reactor at the end of the batch is thus directly related to the emitted gas production rate Te. According to one advantageous embodiment, the pressure in the reactor will be measured at the end of the batch and after cooling to a predetermined temperature, for example to 75° C. or 70° C.

Very advantageously, the measurement of the gas flow rate emitted or the measurement of the pressure prevailing in the reactor during the HTC reaction of the reactor proves to be a sufficient indicator to know the degree of progress of the carbonisation reaction in the reactor. Thus, for a continuous method, it will be possible to modify the temperature parameters in the reactor (via a modification of the temperature of the steam or of the heat transfer fluid), the amount of reagent injected (into the reactor or upstream of it), and/or the residence time of the biomass in the reactor, especially by modifying the flow rate of the incoming biomass, thus making it possible to either improve dehydration or to optimise the reagent consumption. For a batch method, the same reaction parameters could be adapted for the next batch.

In the case of a continuous-operated HTC method, the emitted gas production rate Te is determined by measuring the flow rate of non-condensable gases emitted at the reactor outlet (directly at the reactor outlet). Thus, more precisely, the emission gas production rate Te is calculated from the flow rate of non-condensable gases emitted at the reactor outlet.

The method according to the invention, when carried out continuously, therefore advantageously allows the reaction temperature and/or the amount of reagent injected and/or the residence time in the reactor to be adjusted in real time by measuring the emitted gas flow rate at the reactor outlet and comparing it with the value of the setpoint gas flow rate, throughout the HTC reaction, in a manner that is simple to implement, as the measurement is carried out at the reactor outlet and not thereinside.

The measurement of the gas flow rate emitted during the reaction is preferably carried out at the reactor outlet. The flow rate of gas emitted is preferably measured using a flow meter when the HTC step is continuous. Preferably, the measurement of the flow rate of gases emitted at the reactor outlet is then carried out after the gases emitted have passed through gas condensation or dehydration means, such as a condenser, especially of the "scrubber" type. In this way, it is possible to condense water vapour and the gases emitted, referred to as "non-condensable" are essentially measured, in order to increase the accuracy of the measurement. A water-adsorbing drying filter, such as a zeolite filter, could also be used to obtain the same effect, that is to retain the water vapour so that only the non-condensable fraction of the gases emitted passes therethrough.

The method according to the invention, when carried out in a batch method, advantageously makes it possible to set the reaction temperature and/or the amount of reagent injected and/or the residence time by measuring the pressure within the reactor and comparing it with the setpoint pressure for the next batch. Thus, to reach the setpoint pressure in the next batch, the residence time in the reactor can be adjusted by monitoring the reaction time for the batch method, and/or the temperature within the reactor can be adjusted by cooling the sealed reactor by exchange with a heat transfer fluid through the reactor wall or a coil.

The heat transfer fluid is typically water, especially water in vapour form.

The reagent is typically a catalyst to initiate the HTC reaction, which can then be self-sustaining. Examples of catalysts are especially organic or mineral acids or bases. The acid catalysts are preferably selected from sulphuric acid and linear or branched $C_1$-$C_6$ carboxylic acids, especially linear or branched $C_1$-$C_6$ mono-, di- and di- or tricarboxylic acids, such as formic acid, acetic acid and citric acid.

The hydrothermal carbonisation reaction is well known to the person skilled in the art, who will be able to select the operating ranges of the reaction parameters such as temperature, pressure, and residence time. Preferably, the HTC step is carried out at a high temperature—between 150° C. and 300° C., preferably between 175° C. and 260° C.—and generally under pressure, typically from 10 to 50 bar (that is about 1 to 5 MPa), for a time which typically ranges from 5 min to 12 h, preferably between 1 h and 3 h.

Advantageously, the hydrothermal carbonisation method according to the invention involves the implementation of different complementary steps. In particular, a preliminary step is preferably carried out in which a value for the setpoint gas flow rate $D_c$ or the setpoint pressure Pc, is selected as a function of the desired dryness of the final product. For example, using correlation tables that have been established between gas flow, in particular $CO_2$/pressure, and dryness.

Or, when activating a facility for carrying out an HTC reaction, tests could be carried out to obtain a target dryness level (for example 65%) by setting one or more parameters, for example temperature and residence time (including flow rate), and the gas flow rate emitted is then measured, which becomes the setpoint gas flow rate $D_c$. This amounts to a calibration at constant temperature and residence time, the variable parameter being the amount of reagents. In the following operations, if the emitted gas flow rate De measured deviates from the setpoint value $D_c$, the reagent quantity can be adjusted to get closer to, up to reach this value. The adjustment of the amount of reagent will advantageously be carried out by successive increases and/or decreases, especially to avoid reaction runaway.

The predetermined value of the gas flow rate "$D_c$" (target gas flow rate) can be entered into means for monitoring and controlling the facility for implementing the hydrothermal carbonisation method. During the HTC reaction, advantageously followed by a post-dehydration step, the emitted gas flow rate "De" is measured at the outlet of the HTC reactor, preferably at regular intervals or continuously, and the value of the emitted gas flow rate De measured is compared with that of the setpoint gas flow rate $D_C$ (+/−X %). If the emitted gas flow rate De is different from the setpoint gas flow rate $D_c$, at least one of the three parameters will be adjusted:
  the amount of reagent injected (especially a catalyst for the HTC reaction, preferably an acid catalyst such as citric acid),
  the temperature T within the reactor, and/or
  the residence time in the HTC reactor,
  so as to adjust this value of emitted gas flow rate $D_e$ to be equal to the value of the setpoint gas flow rate $D_c$ or at least to approach said value of $D_c$. If at the next measurement of the emitted gas flow rate, the new value De is still not equal to the value of $D_c$, one of the parameters of the reaction is modified again and so on (feedback loop).

In the order, it is preferable to adjust the amount of reagent injected, the temperature T within the reactor, and finally the residence time.

The adjustment can be done manually or automatically.

The amount of reagent injected is thus increased and/or decreased according to the flow rate measured.

The residence time may be modified by correspondingly modifying the incoming biomass flow rate, and/or by modifying the circulation speed of the biomass in the reactor.

Preferably, the residence time is modified by modifying the flow rate of the incoming biomass.

The temperature within the reactor may be modified by modifying the temperature of the heat transfer fluid and/or the incoming biomass. Preferably, the temperature of the heat transfer fluid will be modified.

According to one particular embodiment, the hydrothermal carbonisation method further comprises a step of extracting at least part of the mixture contained in the reactor. In the case of a continuous method, the extraction is performed continuously.

Another object of the present invention is a method for dehydrating biomass comprising:
  the hydrothermal biomass carbonisation method of the invention, leading to carbonised sludge, and
  a step of mechanically dehydrating the carbonised sludge, leading to a dehydrated sludge.

The mechanical dehydration step may comprise or consist of a pressing step, especially by piston press or filter press. This step may also include or consist of centrifugation.

The dehydrated sludge obtained will advantageously have a dryness of between 40% and 70%, preferably between 60% and 70%.

Another object of the present invention is a facility for hydrothermal carbonisation of biomass containing organic matter, said facility comprising:
  a reactor, means for feeding the biomass into the reactor, means for injecting a heat transfer fluid into the reactor and means for injecting a reagent into the reactor, means for circulating a mixture consisting of the biomass, the heat transfer fluid and the reagent under specific pressure and temperature conditions for transforming the organic matter by a hydrothermal carbonisation reaction, means for outputting the gas emitted in the reactor, characterised in that:
  it includes means for determining the emitted gas production rate during the hydrothermal carbonisation;
  means for comparing said emitted gas production rate Te determined with a setpoint gas production rate value Tc, and
  means for monitoring and controlling the facility making it possible to adjust at least one of the reaction drive parameters, which are the temperature within the reactor, the amount of injected reagent and the residence time in the reactor, in order to adjust the emitted gas production rate Te, so that the value of this emitted gas production rate Te tends to be equal to the value of the setpoint gas production rate Tc.

In a hydrothermal carbonisation facility adapted to a continuous operation of the method, the means for determining the emitted gas production rate comprise means for measuring the emitted gas flow rate at the reactor outlet. These measurement means preferably comprise a flow meter mounted in the gas outlet duct.

Preferably, condensation or dehydration means are provided upstream of the means for measuring the emitted gas flow rate, such as a condenser, especially of the "scrubber" type. A water-adsorbing dehydrating filter, such as a zeolite filter, may also be used.

In a hydrothermal carbonisation facility adapted to batch operation, the means for determining the emitted gas production rate comprise means for measuring the pressure prevailing in the reactor at the end of the cycle.

Preferably, in order to regulate the temperature in the reactor, the facility includes means for cooling by indirect contact with the fluid in the reactor for a batch method.

Advantageously, the facility comprises downstream of the HTC reactor a press, said press comprising at least a biomass inlet, a biomass outlet, said biomass inlet of the press being in fluid connection with the carbonised sludge outlet of the HTC reactor.

BRIEF DESCRIPTION OF THE DRAWINGS

Further advantages and features of the invention will become apparent from the detailed description of non-limiting implementations and embodiments, and the following figures in which:

FIG. 1 is a schematic view of one embodiment of a continuous hydrothermal biomass carbonisation facility according to the invention.

FIG. 2 is a graphical representation which highlights the variation in dehydration performance and in the flow rate of reaction gas and the amount of reagent for a facility for implementing a method carried out continuously; and FIG. 3 is a graphical representation of a mathematical relationship between the dryness of the final cake and the final pressure at 75° C. of an HTC reactor implementing a batch carbonisation method.

DETAILED DESCRIPTION

The device represented in FIG. 1 comprises a reactor 1 arranged to implement a hydrothermal reaction. The following description will focus on embodiments with sludge, but could be implemented with other types of biomass, such as organic waste.

This hydrothermal reaction comprises the following steps:
- a sludge injection step in which sludge is injected into the reactor 1 through a first inlet 11,
- a step of injecting steam as a heat transfer fluid, in which steam is injected into the reactor 1 via a second inlet 12, the second inlet 12 preferably being distinct from the first inlet 11,
- a circulation step in which a mixture consisting of the sludge and the steam injected into the reactor 1 is circulated within the reactor 1,
- a step of continuously extracting at least part of the mixture contained in the reactor 1 through a sludge outlet 14.

The sludge, containing organic matter, comes for example from a hopper 2 to be conveyed into a duct (inlet 11 of the device), for example by gravity. The sludge arriving in the duct typically has a dryness in solids content by weight of between 10 and 30%, typically between 18 and 24%.

The internal space of the reactor 1 is further configured to form a degassing volume 13 in an upper part of this internal space (that is a part of higher altitude than other parts of this internal space). In this degassing volume 13, the mixture does not circulate. This degassing volume 13 is arranged to recover gaseous non-condensables and especially $CO_2$.

The reactor 1 is also provided with a non-condensables outlet connecting the degassing volume 13 to a discharge duct 15 for possible subsequent treatment. This non-condensables outlet is driven by a valve 16 to monitor pressure in the reactor 1.

At this degassing volume or duct 15, means of measuring the gas flow rate 2, such as a flow meter 18, are installed, for example downstream of the duct 15, preferably after a condenser 17, and thus make it possible to measure the emitted gas flow rate, De, during the reaction.

During the implementation of the method according to the invention, the following steps are carried out:

During a preliminary step, referred to as step 0, a setpoint flow rate value $D_C$ is chosen as a function of the desired dryness of the dehydrated biomass and this predetermined value of the gas flow rate "$D_c$" (setpoint flow rate) is entered into the monitoring means of the facility, and then the HTC reaction, and preferably an "ultradehydration", as seen above, is implemented.

During the hydrothermal reaction, an emitted gas flow rate "$D_e$" is measured, preferably at regular intervals or continuously. The measurement of the emitted gas flow rate is processed by the monitoring and control means, with which the value of the emitted gas flow rate $D_e$ is compared with that of the setpoint gas flow rate $D_c$ (+/−X %). Depending on the difference noted between the values of the emitted gas flow rate $D_e$ and the setpoint gas flow rate $D_c$, at least one of the three parameters such as the temperature T° within the reactor 1 is adjusted by monitoring the heat transfer fluid inlet 12, and/or preferably the amount of reagent injected into the reactor 1 from a reagent tank 3 and/or the residence time in the HTC reactor 1.

By regulating at least one of these parameters, this value of De can thus be modified so that it is equal to $D_C$, or at least approaches $D_C$. This regulation step is repeated throughout the hydrothermal reaction (feedback loop), subsequent measurements making it possible to monitor that the emitted gas flow rate $D_e$ corresponds to the setpoint gas flow rate $D_c$ or to adjust the drive parameters until these two emitted gas flow rates $D_e$ and setpoint gas flow rate $D_c$ correspond to each other.

As could have been noticed, stability of the quality of the sludge entering the facility has shown a clear relationship between dehydrating performance and amount of reagent injected. This reagent is a catalyst for the HTC reaction, especially an acid catalyst, chosen from citric acid, formic acid, sulphuric acid and acetic acid.

FIG. 2 is a graphical representation which highlights the variation of the dehydration performance and the flow rate of non-condensable gases (noted NC) emitted by the reactor in continuous operation within the scope of the implementation of a continuous hydrothermal carbonisation method, in which the amount of injection of the reagent is adjustable while the other parameters are fixed such as a constant reaction time of 2 h30, a constant reaction temperature of 185° C., and a single type of sludge treated.

In FIG. 3, a mathematical relationship between the dryness of the final cake and the final pressure at 75° C. of a 3 litres HTC micropilot operating in a batch tank is represented.

As the HTC micro-pilot is completely sealed, the demonstration of reaction gas production is revealed by the final pressure in the reactor. As the test protocol is fixed, the initial amount of product is constant and the initial pressure is equal to the ambient pressure. Any higher pressure after the reaction is the result of a gas residing in the reactor whose saturation pressure is much higher than that of water.

The resulting relationship can be represented as follows: Ln (1/P)=f (Ln ((100−TS)/TS)) with f(x)=−0.3226*x+1.6631 with:
P representing the final pressure at 75° C. in the hydrothermal carbonisation reactor (in bar), which corresponds to the gas production by the HTC reaction, and
TS representing the final dryness of the cake in % of Total Solids (expressed in %).

This formula is equivalent to the following:

Ln $P = f(\text{Ln}(TS/(0.0001 - TS))$ with $f(x) = 03226 \cdot x 10.8734$ with:

P: representing the final pressure at 75° C. in the hydrothermal carbonisation reactor (in Pa), which corresponds to the gas production by the HTC reaction, and
TS: final dryness of the cake in g/L.

The method according to the invention thus allows an adjustment of at least one functional parameter in real time of a continuous hydrothermal carbonisation method and an adjustment of at least one functional parameter from one batch to another for a batch hydrothermal carbonisation method. The adjustment time of a method according to the invention is thus optimised.

The invention claimed is:

1. A method for the hydrothermal carbonisation of a biomass containing organic matter, the method comprising:
    injecting the biomass, a heat transfer fluid and a reagent into a reactor;
    circulating in the reactor a mixture consisting of the biomass, the heat transfer fluid, and the reagent;
    subjecting the mixture to specific pressure and temperature conditions in the reactor such that the organic matter in the biomass undergoes a hydrothermal carbonisation reaction in the reactor and the biomass is transformed into a carbonized biomass,
    determining an emitted gas production rate Te in the reactor during the hydrothermal carbonisation reaction;
    comparing the emitted gas production rate Te in the reactor to a predefined setpoint gas production rate Tc; and
    adjusting at least one reaction drive parameter such that the emitted gas production rate Te in the reactor tends to be equal to or to approach the predefined setpoint gas production rate Tc, wherein the at least one reaction drive parameter is selected from the group consisting of a temperature in the reactor, an amount of the reagent injected into the reactor, and a residence time of the biomass in the reactor.

2. The method according to claim 1, wherein the method is carried out continuously, and wherein the method further comprises:
    measuring a flow rate of non-condensable gases emitted from an outlet of the reactor during the hydrothermal carbonisation reaction; and
    calculating the emitted gas production rate Te based on the measurement of the flow rate of non-condensable gases emitted from the outlet of the reactor.

3. The method according to claim 2, further comprising:
    prior to or during the hydrothermal carbonisation reaction, defining the predefined setpoint gas production rate Tc as a function of a desired dryness of the biomass after the biomass has been subjected to a dehydration process performed subsequent to the hydrothermal carbonisation reaction.

4. The method according to claim 2, further comprising:
    prior to measuring the flow rate of the non-condensable gases emitted from the outlet of the reactor, passing the non-condensable gases through a condenser or other dehydration means.

5. The method according to one of claim 2, further comprising:
    adjusting the temperature in the reactor during the hydrothermal carbonisation reaction by modifying a temperature of the heat transfer fluid injected into the reactor; and/or
    adjusting the residence time of the biomass in the reactor during the hydrothermal carbonisation reaction by modifying a flow rate of the biomass injected into the reactor.

6. The method according to claim 1, wherein the reactor is sealed during the hydrothermal carbonisation reaction and the method is carried out in a batch mode, and wherein the method further comprises:
    cooling the reactor to a set target temperature;
    after cooling the reactor to the set target temperature, measuring a pressure prevailing in the reactor at the set target temperature; and
    calculating the emitted gas production rate Te based on the measurement of the pressure prevailing in the reactor at the set target temperature.

7. The method according to claim 6, further comprising:
    adjusting the residence time of the biomass in the reactor based on a reaction time of a previous hydrothermal carbonisation reaction carried out in the reactor.

8. The method according to claim 6, further comprising:
    cooling the reactor to the set target temperature by heat exchange with another heat transfer fluid through a wall of the reactor or a coil within the reactor.

9. The method according to claim 1, further comprising:
    increasing or decreasing the amount of the reagent injected into the reactor such that the emitted gas production rate Te tends to be equal to or to approach the predefined setpoint gas production rate Tc.

10. A method for dehydrating biomass comprising:
    injecting the biomass, a heat transfer fluid, and a reagent into a reactor;
    circulating in the reactor a mixture consisting of the biomass, the heat transfer fluid, and the reagent;
    subjecting the mixture to specific pressure and temperature conditions in the reactor such that organic matter in the biomass undergoes a hydrothermal carbonisation reaction in the reactor and the biomass is transformed into a carbonized biomass,
    determining an emitted gas production rate Te in the reactor during the hydrothermal carbonisation reaction;
    comparing the emitted gas production rate Te in the reactor to a predefined setpoint gas production rate Tc;
    adjusting at least one reaction drive parameter such that the emitted gas production rate Te in the reactor tends to be equal to or to approach the predefined setpoint gas production rate Tc, wherein the at least one reaction drive parameter is selected from the group consisting of a temperature in the reactor, an amount of the reagent injected into the reactor, and a residence time of the biomass in the reactor; and
    after the hydrothermal carbonisation reaction, mechanically dehydrating the carbonized biomass to form a dehydrated biomass.

11. The method according to claim 2, wherein the emitted gas production rate Te is determined during the hydrothermal carbonisation reaction in the reactor, the emitted gas production rate Te is compared to the predefined setpoint gas production rate Tc during the hydrothermal carbonisation reaction in the reactor, and the at least one reaction drive parameter is adjusted in real time during the hydrothermal carbonisation reaction in the reactor.

12. The method according to claim 1, wherein the Te is at least partly attributable to gases emitted from the organic matter during the hydrothermal carbonisation reaction.

13. The method according to claim 1, wherein, during the hydrothermal carbonisation reaction, the organic matter undergoes hydrolysis and then decarboxylation and dehydration.

14. The method according to claim 1, wherein the reagent comprises a catalyst configured to initiate the hydrothermal carbonisation reaction.

15. The method according to claim 14, wherein the reagent comprises at least one acid catalyst selected from the group consisting of sulphuric acid, linear $C_1$-$C_6$ carboxylic acids, and branched $C_1$-$C_6$ carboxylic acids, and wherein the linear $C_1$-$C_6$ carboxylic acids and the branched $C_1$-$C_6$ carboxylic acids are mono-, di-, or tricarboxylic acids.

16. The method according to claim 6, wherein the set target temperature is 75 degrees Celsius, and wherein the method further comprises:

calculating an estimated final dryness of the biomass after the carbonized biomass has been subjected to a subsequent dehydration process according to the following equation:

$$\mathrm{Ln}\,P = f(\mathrm{Ln}(TS/(0.0001-TS))),$$

where $f(x) = -03226 * x + 10.8734$,

P is the pressure prevailing in the reactor at the set target temperature in Pa, and TS is the final dryness of the biomass in g/L.

* * * * *